(12) United States Patent
Tsai

(10) Patent No.: US 7,461,715 B1
(45) Date of Patent: Dec. 9, 2008

(54) PERSONAL MOBILITY VEHICLE WITH RELEASABLE FOLDING SEAT

(76) Inventor: Fu-Hsun Tsai, 74, Guoguang 8th Street, Yongkang, Tainan (TW)

( * ) Notice: Subject to any disclaimer, the term of this patent is extended or adjusted under 35 U.S.C. 154(b) by 0 days.

(21) Appl. No.: 12/129,675

(22) Filed: May 29, 2008

(51) Int. Cl.
*B62D 61/00* (2006.01)

(52) U.S. Cl. .................. 180/208; 180/65.1; 280/650

(58) Field of Classification Search ............ 280/87.041, 280/87.042, 650, 651; 180/65.1, 208
See application file for complete search history.

(56) References Cited

U.S. PATENT DOCUMENTS

| | | | |
|---|---|---|---|
| 6,457,544 B1 * | 10/2002 | Sung | 180/220 |
| 7,029,015 B2 * | 4/2006 | Lin | 280/47.26 |
| 7,077,229 B2 * | 7/2006 | Lee | 180/220 |
| 7,124,849 B2 * | 10/2006 | Huang | 180/208 |
| 2003/0141121 A1 * | 7/2003 | Flowers et al. | 180/65.1 |

* cited by examiner

*Primary Examiner*—Toan C To

(57) ABSTRACT

A personal mobility vehicle includes a housing comprising an internal space, two front wheels, a rear mating member, and a rear telescopic T-shaped handle; a battery powered electric motor in the housing for rotating the front wheels; a control on the handle for controlling movement and steering of the vehicle; and a seat assembly comprising a front foot rest having a corresponding mating member adapted to releasably secure to the mating member, a rear base hingedly secured to the foot rest and including an upward projecting fastening member, at least one rear wheel, a seat, and a seat post extending downward from the seat to pivotably fasten in the fastening member. Detaching the corresponding mating member from the mating member, folding the foot rest toward the base, and folding the base toward the seat post will fold the seat assembly for disposing in the space of the housing.

9 Claims, 5 Drawing Sheets

PERSONAL MOBILITY VEHICLE WITH RELEASABLE FOLDING SEAT

BACKGROUND OF THE INVENTION

1. Field of Invention

The invention relates to battery powered personal mobility vehicles and more particularly to a personal mobility vehicle having a folding seat which is adapted to detach from the vehicle, fold, and store in the vehicle when not in use.

2. Description of Related Art

A great array of battery powered personal mobility vehicles for the disabled and sick are available on the market.

There have been numerous suggestions in prior patents for personal mobility vehicles. For example, U.S. Pat. No. 5,697,465 discloses a personal mobility vehicle capable of providing a high degree of maneuverability in turning.

So far as the inventor is aware personal mobility vehicles with folding components are not disclosed. The invention is thus addressed to provide a folding personal mobility vehicle.

SUMMARY OF THE INVENTION

It is therefore one object of the invention to provide a folding personal mobility vehicle having a folding seat which is adapted to detach from the vehicle, fold, and store in the hollow vehicle when not in use.

The above and other objects, features and advantages of the invention will become apparent from the following detailed description taken with the accompanying drawings.

DETAILED DESCRIPTION OF THE INVENTION

Figure 1:
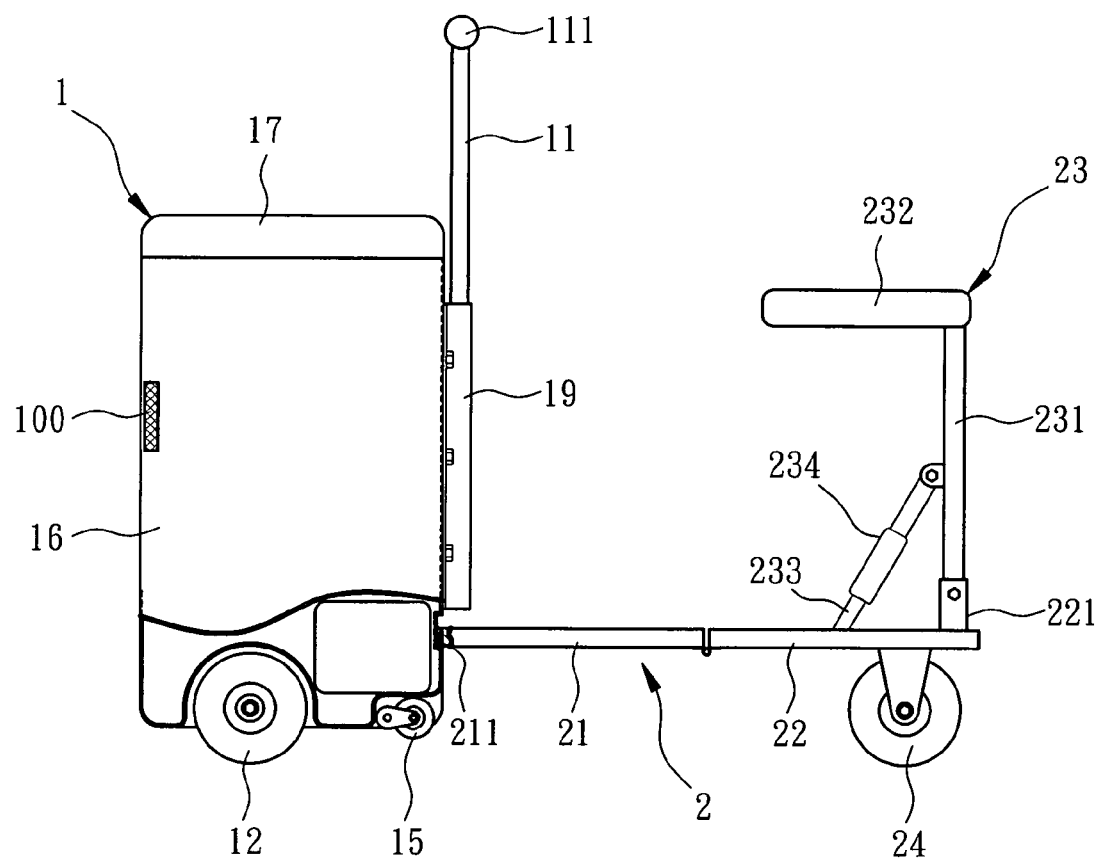
FIG. 1 is a side elevation of a preferred embodiment of folding personal mobility vehicle according to the invention with the surface of a lower portion of the vehicle housing being removed for showing details therein.
Figure 2:
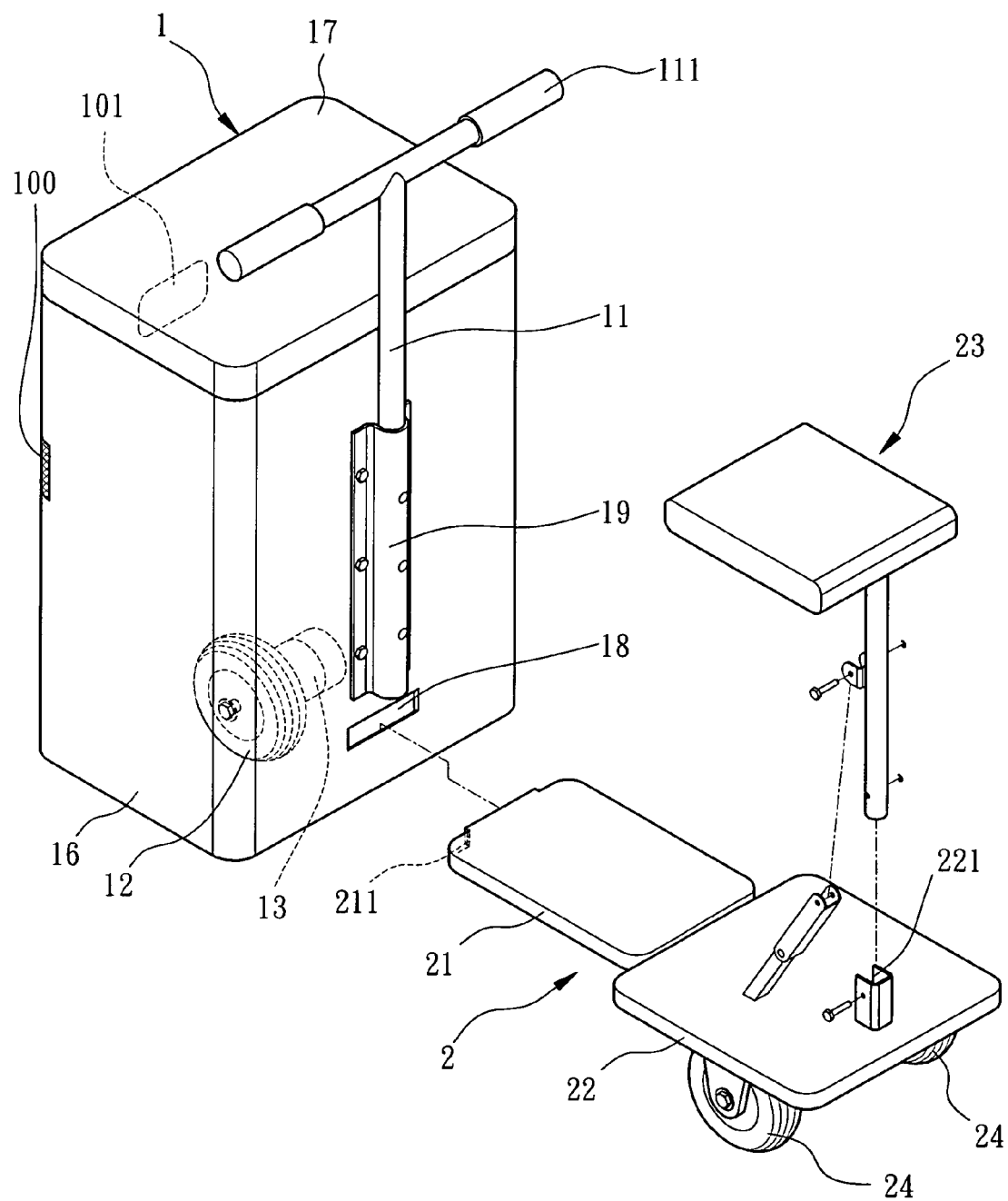
FIG. 2 is an exploded perspective view of the personal mobility vehicle.
Figure 3:
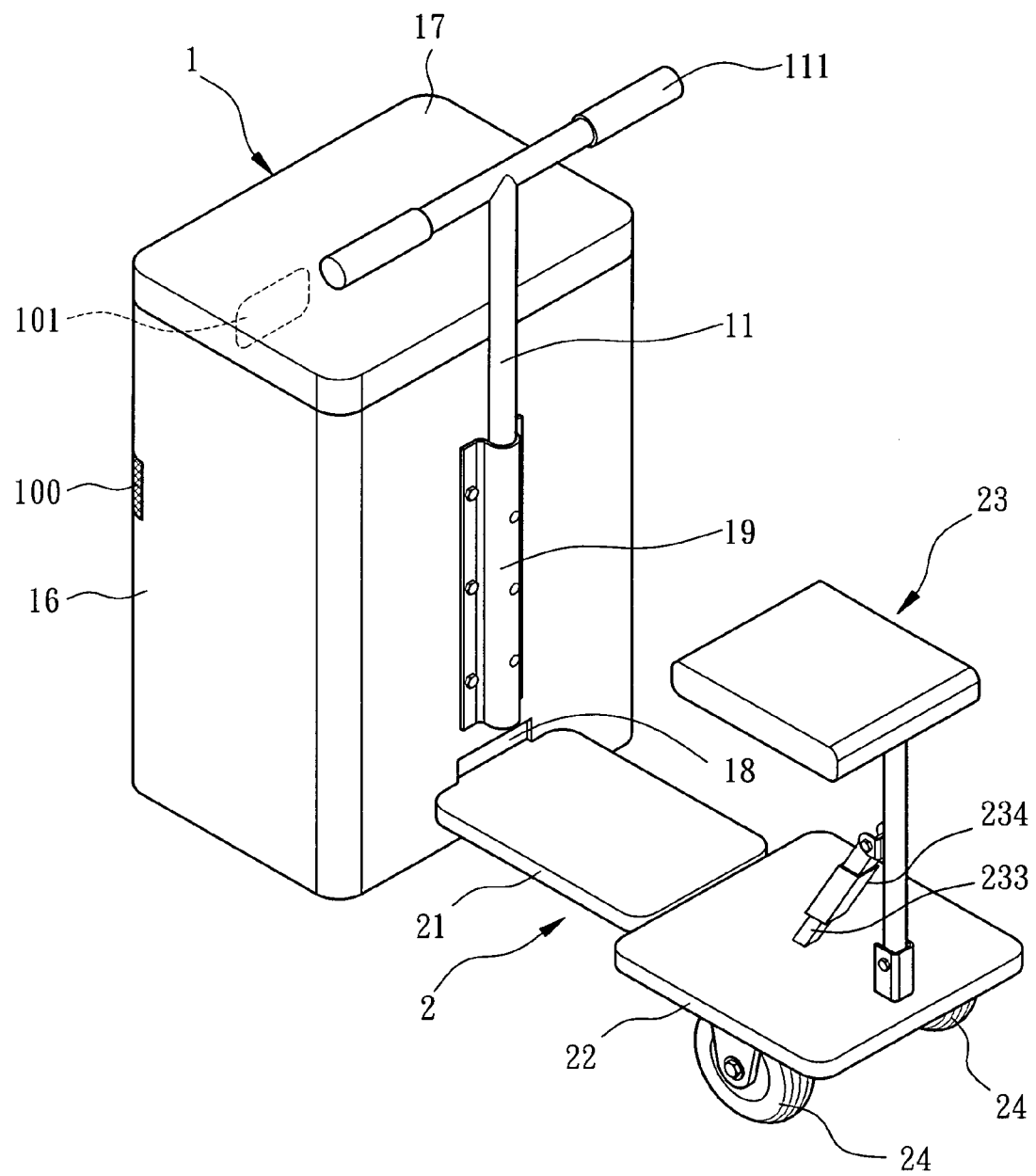
FIG. 3 is a perspective view of the assembled personal mobility vehicle to be ready for use.

Referring to FIGS. 1 to 6, a personal mobility vehicle in accordance with a preferred embodiment of the invention is shown. The vehicle comprises a vehicle housing 1 and a seat assembly 2. Each component is discussed in detail below.

The vehicle housing 1 is a parallelepiped with an internal space 16 defined therein. The vehicle housing 1 comprises two spaced front wheels 12 which are steerable, a hinged top hood 17, a battery unit 14 having one or more batteries, an electric motor 13 driven by the battery unit 14 to rotate the front wheels 12, two retractable anti-tip wheels 15 behind the front wheels 12 and below the battery unit 14, a recessed coupling 18 on the rear surface proximate the bottom of the vehicle housing 1, a headlight 101 mounted on the central upper portion of the front surface of the vehicle housing 1 and electrically connected to the battery unit 14, and two indicator lights 100 on the two front corners electrically connected to the battery unit 14, an upright support 19 mounted on the rear surface above the coupling 18 and having a substantially half circular section, and a T-shaped handle 11 slidably mounted in the support 19 by selectively positioning a spring-biased detent (e.g., metal ball (not numbered)) in one of a series apertures (not numbered) formed vertically along the support 19 so that a rider may adjust the height of the handle 11 prior to riding the vehicle (i.e., the handle 11 being telescopic with respect to the support 19), the handle 11 including two padded gripping members 111 on both ends of the horizontal portion thereof so that the rider may feel a degree of comfort when maneuvering the vehicle. Moreover, a control (not shown) is mounted on the horizontal portion of the handle 11 for controlling movement and steering of the vehicle.

The seat assembly 2 comprises a rectangular foot rest 21 having a mated coupling 211 on its front end, the mated coupling 211 being adapted to releasably mount in the coupling 18, a rectangular rear base 22 having its front end hingedly secured to the foot rest 21 and including an upright short hollow member 221 fixedly formed on the top surface, two non-steerable rear wheels 24 mounted under the base 22, a seat unit 23 including a seat 232, an upright seat post 231 extending downward from the seat 232 and having its lower end pivotably mounted in the hollow member 221 by a pin (not numbered), and an inclined folding brace 233 having a short lower portion fixedly secured to the top surface of the base 22 and an elongated upper portion pivotably secured to an intermediate portion of the seat post 231 by a pin (not numbered), the upper portion and the lower portion of the brace 233 being pivotably secured together, and an enhancement sleeve 234 securely put on the pivotal joint of the upper portion and the lower portion of the brace 233 so as to fix the brace 233 and in turn increase support of the seat post 231.

In use, a rider may pivot the anti-tip wheels 15 to dispose in an upright position. Next, the rider may sit on the seat 232 and adjust the height of the handle 11. Further, the rider may use both hands to grip the gripping portions 111 and maneuver the control to steer the vehicle. Preferably, the anti-tip wheels 15 are castors and are adapted to provide the high degree of maneuverability in turning the vehicle.

Figure 4:
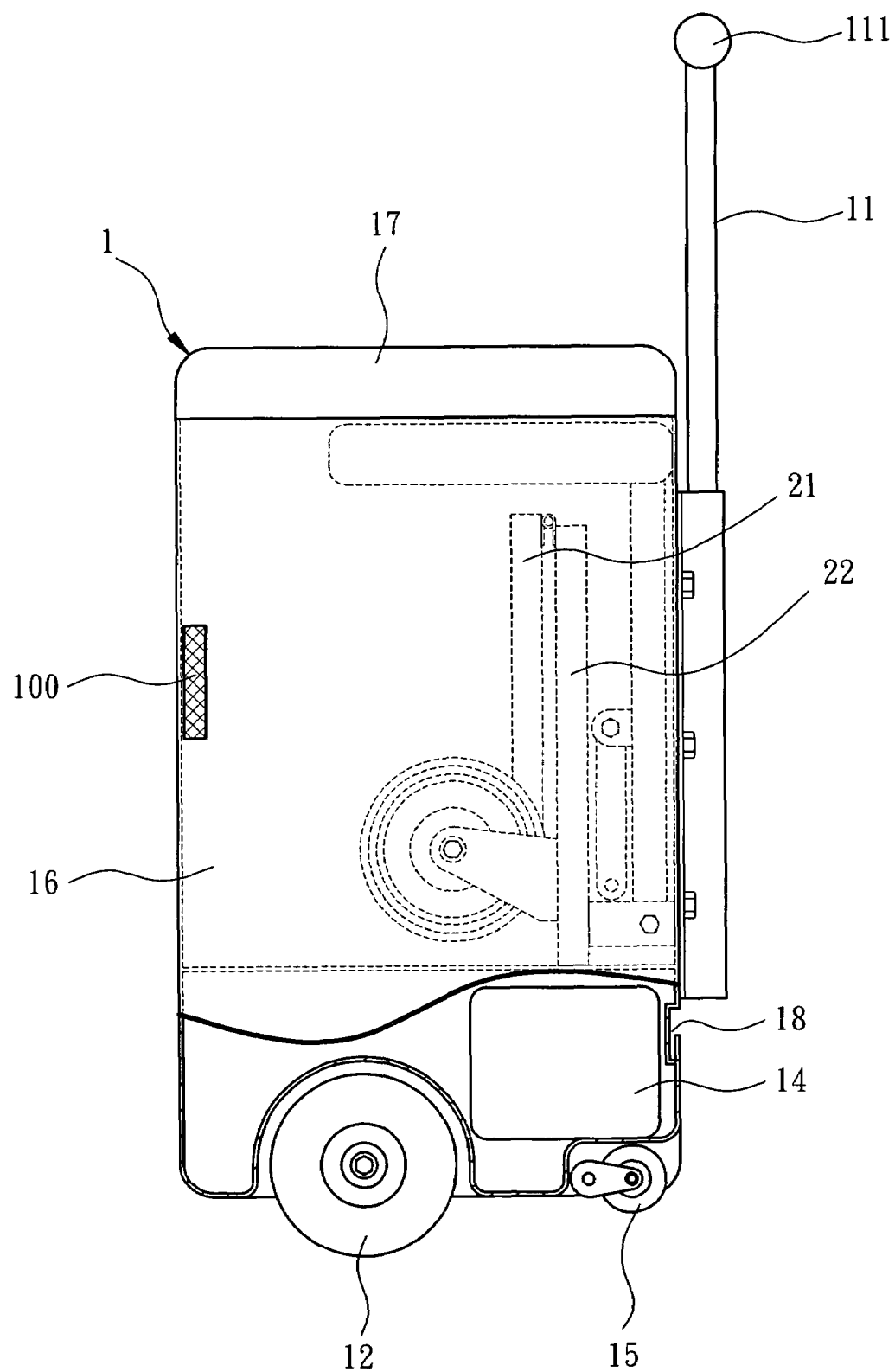
FIG. 4 is a side elevation of the folded personal mobility vehicle with the folded seat assembly stored in the vehicle housing being shown in dotted lines.
Figure 6:
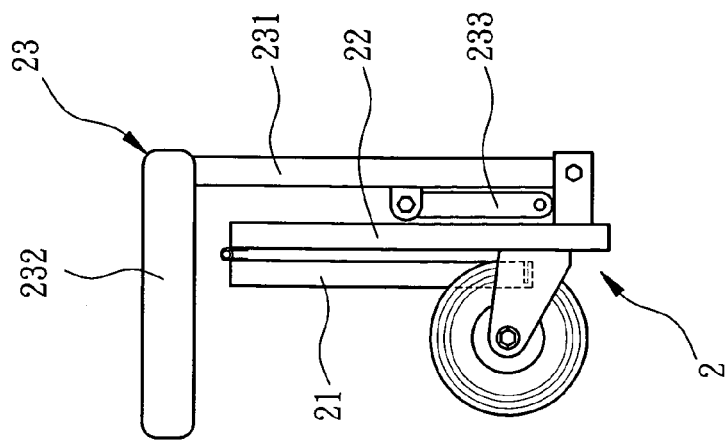
FIG. 6 is a view similar to FIG. 5 where the seat assembly is folded.
Figure 5:
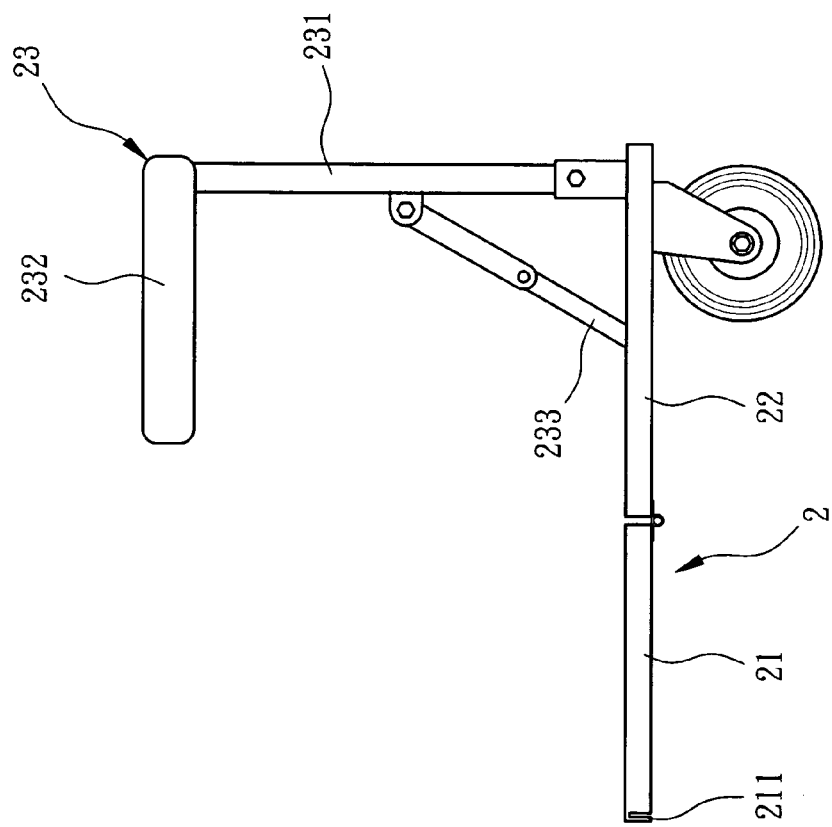
FIG. 5 is a side elevation of the detached seat assembly of FIG. 1.

As shown in FIGS. 4 to 6 specifically, for storage or not in use, an individual may detach the mated coupling 211 from the coupling 18. Next, retract the anti-tip wheels 15 into the vehicle housing 1 to be dispose in a horizontal position. Next, fold the foot rest 21 toward the base 22 until they are substantially parallel. Next, remove the enhancement sleeve 234. Next, remove the pin fastened the seat post 231 and the hollow member 221 so that the base 22 may be pivoted to be substantially parallel to the seat post 231. Next, secure the seat post 231 to the base 22 again by means of the pin. The seat assembly 2 is thus folded (see FIG. 6). Finally, open the hood 17 and place the folded seat assembly 2 in the space 16 of the vehicle housing 1 (see FIG. 4). Preferably, the handle 11 is retracted a maximum portion thereof into the support 19 so that the projecting portion of the handle 11 can be reduced to a minimum for saving storage space.

While the invention herein disclosed has been described by means of specific embodiments, numerous modifications and variations could be made thereto by those skilled in the art without departing from the scope and spirit of the invention set forth in the claims.

What is claimed is:

1. A personal mobility vehicle comprising:
    a housing comprising an internal storage space, two front wheels, a rear mating member, and a rear telescopic T-shaped handle;

a battery powered electric motor mounted in the housing for rotating the front wheels;

a control mounted on the handle for controlling movement and steering of the personal mobility vehicle; and a seat assembly comprising a front foot rest having a corresponding mating member adapted to releasably secure to the mating member, a rear base hingedly secured to the foot rest and including an upward projecting fastening member, at least one rear wheel mounted under the base, a seat, and a seat post extending downward from the seat to pivotably fasten in the fastening member;

whereby detaching the corresponding mating member from the mating member, folding the foot rest toward the base to be substantially parallel thereto, and disposing the base to be substantially parallel to the seat post by pivoting will fold the seat assembly for being adapted to dispose in the storage space of the housing.

2. The personal mobility vehicle of claim 1, further comprising two retractable anti-tip wheels mounted behind the front wheels.

3. The personal mobility vehicle of claim 2, wherein the anti-tip wheels are castors.

4. The personal mobility vehicle of claim 1, wherein the front wheels are steerable and the at least one rear wheel is nonsteerable.

5. The personal mobility vehicle of claim 1, wherein the front wheels are non-steerable and the at least one rear wheel is steerable.

6. The personal mobility vehicle of claim 1, further comprising an inclined folding brace having a lower portion fixedly secured to the base and an upper portion pivotably secured to an intermediate portion of the seat post.

7. The personal mobility vehicle of claim 6, further comprising an enhancement sleeve securely put on a pivotal joint of the upper portion and the lower portion of the brace.

8. The personal mobility vehicle of claim 1, wherein the number of the at least one rear wheel is one.

9. The personal mobility vehicle of claim 1, wherein the number of the at least one rear wheel is two.

* * * * *